United States Patent [19]

Karcher

[11] Patent Number: 4,696,479

[45] Date of Patent: Sep. 29, 1987

[54] UNITIZED SHAFT SEAL ASSEMBLY

[75] Inventor: Merrill Karcher, Lake Geneva, Wis.

[73] Assignee: Triseal Corporation, Woodstock, Ill.

[21] Appl. No.: 769,177

[22] Filed: Aug. 26, 1985

[51] Int. Cl.[4] .................. F16J 15/32; F16J 15/34; F16J 15/54

[52] U.S. Cl. ........................... 277/37; 277/38; 277/47; 277/153

[58] Field of Search .............. 277/35, 37, 38, 39, 277/50, 51, 152, 153, 47, 48, 49, 92, 95, 40, 41

[56] References Cited

U.S. PATENT DOCUMENTS

| | | | |
|---|---|---|---|
| 1,918,121 | 7/1933 | Mulhern | 277/51 |
| 2,076,716 | 4/1937 | Fretter | 277/41 |
| 2,405,120 | 8/1946 | Evans | 277/47 X |
| 3,021,161 | 2/1962 | Rhoads et al. | 277/39 X |
| 3,762,726 | 10/1973 | Jornhagen | 277/39 |
| 4,226,426 | 10/1980 | Messenger | 277/153 X |

FOREIGN PATENT DOCUMENTS

| | | | |
|---|---|---|---|
| 492077 | 4/1953 | Canada | 277/51 |
| 2500099 | 7/1976 | Fed. Rep. of Germany | 277/153 |

*Primary Examiner*—Allan N. Shoap
*Attorney, Agent, or Firm*—Thomas R. Vigil

[57] ABSTRACT

The unitized shaft seal assembly comprises an outer rigid annular member including an outer annular ring portion with a flange extending radially inwardly from one edge thereof and an inner annular ring portion with a flange extending radially inwardly from one edge thereof, an inner rigid annular ring member having a radially outwardly extending flange extending from one edge thereof and a radially outwardly extending flange extending from the other edge thereof, a flexible annular sealing member disposed between the rigid annular ring members, a coiled spring extending completely around a portion of said sealing member for urging an inner surface of the sealing member against a radially outwardly facing surface of the inner annular member, and an intermediate rigid annular member positioned on one side of the assembly and having a radially inwardly disposed portion which is positioned adjacent and axially inwardly of a flange of the inner annular member and an outer radially disposed portion which is positioned adjacent and axially inwardly of a flange of the outer member. The inner annular member has a layer of elastomeric material on the inwardly facing surface thereof which extends around and over one flange of the inner member to form a seal between a flange of the inner member and a flange of the outer member.

8 Claims, 3 Drawing Figures

UNITIZED SHAFT SEAL ASSEMBLY

BACKGROUND OF THE INVENTION

1. Field of the Invention

The present invention relates to a unitized shaft seal assembly and particularly to an assembly which has an outer portion and an inner portion which rotate relative to each other and wherein at least one seal is provided within the assembly and one seal is provided against a shaft.

2. Description of the Prior Art

Heretofore a number of shaft seal assemblies have been provided wherein one portion of the assembly rotates relative to another portion of the assembly and a seal is formed between the assembly and a shaft or the assembly and an outer housing. Typically, a seal is also provided within the assembly between the moving parts thereof.

Often these components of the shaft seal assembly are axially separable from each and are not unitized into one unitary or unitized assembly.

Examples of the previous proposed shaft seal assemblies are disclosed in the following U.S. Patents:

| U.S. Pat. No. | Patentee |
| --- | --- |
| 3,011,814 | Rhoads et al |
| 3,021,161 | Rhoads et al |
| 3,156,474 | Nelson |
| 3,179,424 | Carson et al |
| 3,341,265 | Patterson |
| 3,479,728 | Burfield et al |
| 3,511,513 | Dahlheimer |
| 4,432,557 | Drucktenhengst |
| 4,428,586 | Romero |
| 4,526,384 | Riley et al |
| 4,527,673 | Szcupak |
| 4,531,747 | Miura |
| 4,531,748 | Jackowski |

The various patents referred to above show different assemblies having inner and outer annular members with a flexible sealing member disposed between the inner and outer annular members and with a coiled spring urging the flexible sealing member against the inner annular member. Also, these prior art assemblies show annular elastomeric members which have different shapes and forms and which are bonded to either the inner annular member or the outer annular member.

As will be described in greater detail hereinafter, the unitized shaft seal assembly of the present invention provides an inner annular member and an outer annular member with a flexible sealing member disposed therebetween and including a spring around the sealing member to urge the sealing member against the inner annular member and with a layer of elastomeric material provided on and around portions of the inner annular member for forming two seals with the shaft and one seal with a radially inwardly extending flange of the outer annular member and further including an intermediate annular member positioned between the inner and outer annular members for holding components within the unitized seal assembly and with the inner annular member having radially outwardly extending flanges on either edge thereof for being positioned adjacent an inner radially extending flange of the outer annular member on one side and an inner radially extending flange of the intermediate member on the other side for holding all the components of the assembly together in a unitized manner.

SUMMARY OF THE INVENTION

According to the invention, there is provided a unitized shaft seal assembly comprising an outer rigid annular member including an inner annular ring portion and an outer annular ring portion axially spaced from each other and generally parallel to each other, a first, short, radially inwardly extending flange extending from one edge of said outer annular ring portion, a second, longer radially inwardly extending flange extending from one edge of said inner annular ring portion, and an intermediate flange extending between and integral with the other edges, respectively, of said inner and outer annular ring portions with said outer annular ring portion extending axially outwardly in one direction from said intermediate flange and said inner annular ring portion extending axially outwardly in the opposite direction from said intermediate flange, an inner rigid annular member including an annular, third ring portion generally parallel to said ring portions of said outer annular member, a third, short radially outwardly extending flange extending from one edge of said third ring portion and a fourth, longer radially outwardly extending flange extending from the other edge of said third ring portion, a flexible annular sealing member disposed between said rigid annular members, a coiled spring extending completely around a portion of said flexible annular sealing member for urging a radially inwardly facing surface or edge of said sealing member against a radially outwardly facing surface of said inner annular member, a generally L in cross-section, intermediate rigid annular member being positioned on one axially facing side of said assembly and including a radially extending annular body having a radially inwardly disposed inner portion which is positioned adjacent to and axially inwardly of said third, short flange of said inner annular member so as to be situated between said spring and said third, short flange so that said third, short flange overlaps said inner portion of said radially extending annular body of said intermediate member and said inner portion having an inner annular edge spaced radially outwardly from said radially outwardly facing surface of said inner annular member, said radially extending annular body being spaced axially inwardly of said first, short flange of said outer annular member and having a radially outwardly extending outer portion positioned parallel to said intermediate flange, said intermediate annular member also including an outer ring portion which is integral with an outer annular edge of said outer portion of said radially extending annular body, which extends axially outwardly from said annular body and which is positioned adjacent to and generally parallel to said outer annular ring portion of said outer annular member and having an outer edge on one axially facing side of said intermediate member which is disposed adjacent to an inner axially facing surface of said first, short flange of said outer annular member, and said radially inwardly extending inner portion being disposed axially inwardly of said third, short flange of said inner annular member, an annular elastomeric layer of material on a radially inwardly facing surface of said inner annular member and extending axially from a circle generally opposite said third short flange on and along said inwardly facing surface of said inner annular member to the other axially disposed side of said inner annular member, radially outwardly along said fourth, longer flange around an outer end of said fourth flange and radially inwardly along an axially inwardly facing surface of said fourth flange toward the radially outwardly facing surface of said inner annular member, said second longer flange of said outer annular member having an inner annular edge spaced radially outwardly from said radially outwardly facing surface of said inner annular member and being positioned adjacent and axially inwardly of said fourth, longer flange of said inner annular member, said first, short flange being thinner than said second, longer flange and said third, short flange being thinner than said fourth, longer flange, and said layer of elastomeric material having an annular bead integral therewith and located on the axially inwardly facing surfaces of said fourth, longer flange, radially inwardly of the outer end of said fourth, longer flange, and, extending outwardly of said layer of elastomeric material and axially of the assembly to engage and form a seal with an outer axially facing surface of said second, longer flange of said outer annular member, and the outer radially inwardly facing surface of said layer of elastomeric material providing at least one sealing surface with a shaft on which the seal assembly is mounted.

DESCRIPTION OF THE PREFERRED EMBODIMENT

Figure 1:
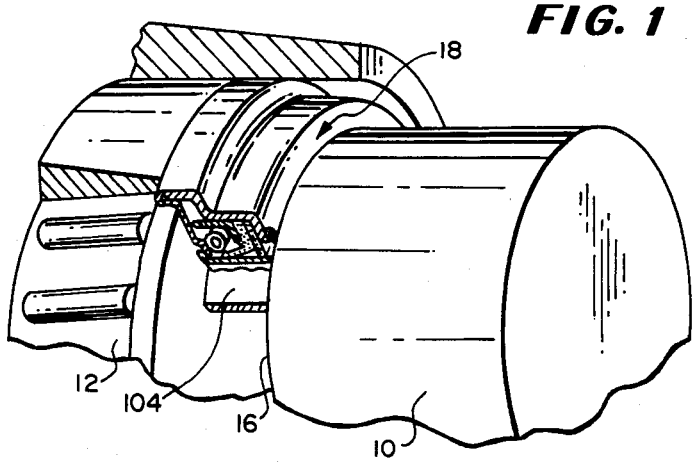
FIG. 1 is a fragmentary perspective view of a shaft and shows the unitized shaft seal assembly of the present invention mounted on the shaft with portions broken away to show a cross-section of the unitized shaft assembly.

Referring now to the drawings in greater detail, there is illustrated in FIG. 1 a shaft 10 which has a bearing 12 mounted thereon and an annular slot 16 on one side of the bearing in which is received a unitized shaft seal assembly 18 constructed in accordance with the teachings of the present invention.

Figure 2:
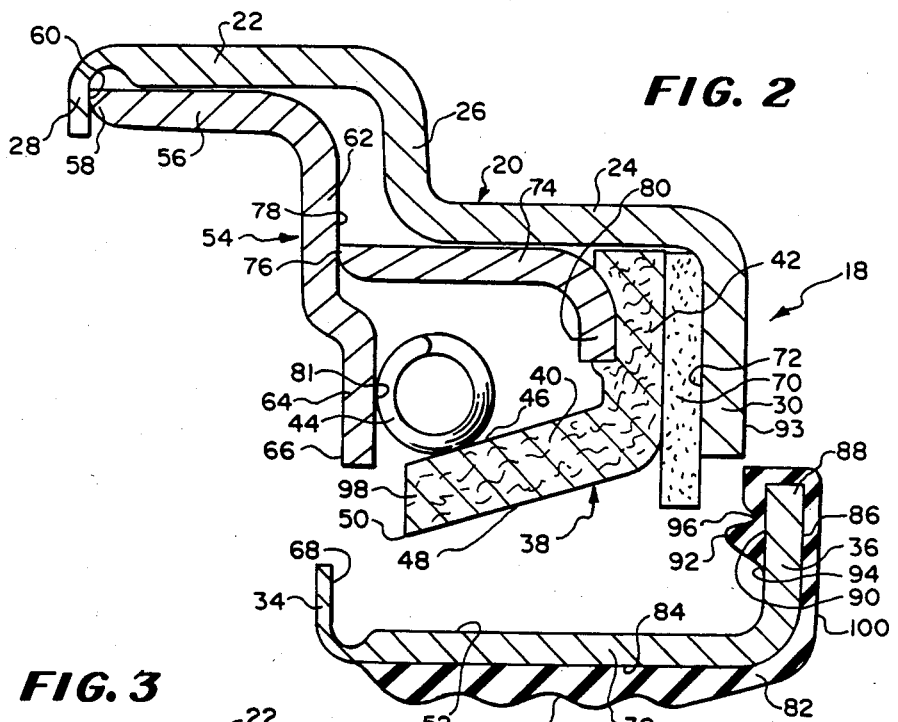
FIG. 2 is an enlarged partially exploded cross-sectional view of the shaft seal assembly shown in FIG. 1.
Figure 3:
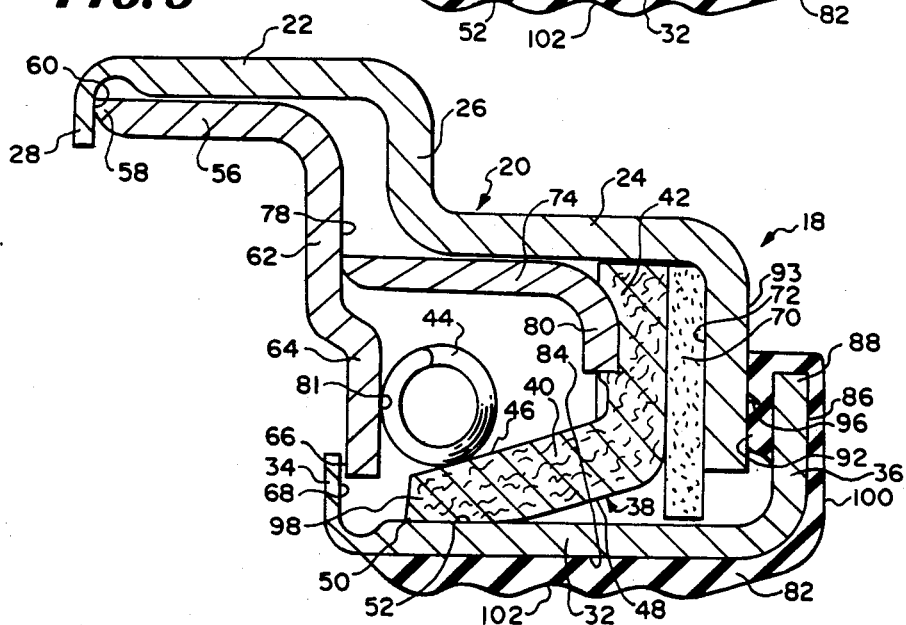
FIG. 3 is a cross-sectional view of the shaft seal assembly shown in FIG. 1.

As best shown in FIGS. 2 and 3, the unitized shaft seal assembly 18 includes an outer annular member 20 which has an outer annular ring portion 22 and an inner annular ring portion 24, with the ring portions 22 and 24 being integral with, and connected by, an intermediate annular flange 26.

On one side of the outer annular ring portion 22 opposite the intermediate flange 26 is disposed a short radially inwardly extending flange 28. Another or second, but longer, radially inwardly extending flange 30 extends inwardly from the edge of the inner annular ring portion 24 opposite the intermediate flange 26. As shown, the first short flange 28 is thinner than the longer radially inwardly extending flange 30.

The seal assembly further includes a second inner annular member 32 which has a third short radially outwardly extending flange 34 and a fourth longer radially outwardly extending flange 36.

The unitized shaft seal assembly 18 further includes a flexible annular sealing member 38 which is typically made out of leather but could be made out of an elastomeric material and which has a generally axially extending portion 40 which also extends slightly radially inwardly and a radially outwardly extending portion 42.

A coiled spring 44 extends completely around the flexible annular seal member 38 and engages an outer surface 46 of the generally axially extending portion 40 and urges a radially inwardly facing surface 48 or at least a radially inwardly disposed corner edge 50 of the flexible sealing member 38 toward and against a radially outwardly facing surface 52 of the inner annular member 32 when the inner and outer annular members 20 and 32 are assembled together in the assembly 18.

The seal assembly 18 further includes an intermediate annular member 54 which has an outer annular ring portion 56 having an axially facing outer edge 58 disposed adjacent an axially inner facing surface 60 of the first short flange 28. The intermediate annular member 54 then includes a radially inwardly extending portion 62 which extends toward the inner annular member 32 and which has an axially inwardly offset inner flange 64 extending radially inwardly and having an annular axially outwardly facing marginal surface area 66 which, as shown in FIG. 3, is disposed adjacent an axially inwardly facing surface 68 of the third short flange 34 of the inner annular member 32.

The seal assembly 18 further includes an annular felt washer or ring 70 which is disposed between an axially inwardly facing surface 72 of the third longer flange 30 and the radially outwardly extending portion 42 of the flexible seal member 38. If desired the felt washer 70 can be omitted to reduce heat generation in the seal assembly 18. Also, an annular spring retaining ring 74 is disposed between the annular members 20 and 32 and has one side edge 76 that is disposed adjacent an axially inwardly facing surface 78 of the radially inwardly extending portion 62 of the intermediate annular member 54 and has a radially inwardly extending short flange 80 extending inwardly from the other edge of the spring retaining ring member 78. Typically, the radially outwardly extending portion 42 of the flexible annular sealing member 38 is fixed to this flange 80 of the spring retaining ring member 78.

Also, it will be apparent from FIGS. 2 and 3 that an axially inwardly facing surface 81 of the inwardly extending offset flange 64 of the intermediate annular member 54 bears against the coiled spring 44 and retains same in place within the assembly 18.

According to the teachings of the present invention, the inner annular member 32 not only has the two radially outwardly extending flanges 34 and 36 but also has a layer of elastomeric material 82 situated on a radially inwardly facing surface 84 of the inner annular member 32 and extending axially from a circle situated beneath and generally opposite the third short flange 34 on and along the surface 84 to the second flange 36. From there the layer 82 extends radialy outwardly along an axially outer facing surface 86 of the flange 36 to and around an end 88 of the flange 36 and radially inwardly along an axially inwardly facing surface 90 of the flange 36 toward but not to the radially outwardly facing surface 52 of the inner annular member 32. The layer of elastomeric material 82 has an annular bead 92 formed integral therewith and positioned inwardly of the outer end 88 of the flange 36 and extending outwardly from the layer of elastomeric material 82 that is disposed adjacent and on the axially inwardly facing surface 90 of the flange 36, as shown in FIG. 2. This bead 92 is adapted to engage and form a seal with an axially outwardly extending surface 93 of the second radially inwardly extending flange 30 of the first annular member 20.

When the inner and outer annular members 20 and 32 are assembled, as shown in FIG. 1 and in larger scale in FIG. 3, the bead 92 is compressed to form a seal with the surface 93 of the flange 30. To facilitate compression of the bead 92, the bead 92 is formed adjacent or at an inner end 94 of the layer of elastomeric material and between the end 94 and a groove 96 formed in the layer of elastomeric material between the end 88 of the flange 36 and the bead 92.

Also, it will be apparent from FIG. 3 that when the parts of the unitized shaft seal assembly 18 are assembled together a free end portion 98 of the generally axially extending portion 40 of the flexible annular sealing member 38 is compressed between the spring 44 and the radially outwardly facing surface 52 of the inner annular member 32 at the same time the bead 92 is compressed between the flanges 36 and 30.

Also, it will be apparent that with the flange 36 radially overlapping the flange 30 and the flange 34 radially overlapping the inner marginal surface 66 of the radially inwardly extending flange 64 of the intermediate annular member 54, the members 54, 20, 38, the spring 44 and the felt washer 70 are all held or clamped between the flanges 34 and 36. Actually they are not clamped together but are held together between the flanges 34 and 36 such that relative rotation can take place between the annular member 32 and the annular member 20 with seals being formed between the bead 92 and the surface 93, and the edge or surface 48 of the sealing member 38 and the surface 52. Also, seals are formed between the layer 82 and the shaft 10.

In assembling the parts of the unitized shaft seal assembly 18, all the parts of the assembly except for the intermediate annular member 54 are assembled. Then, the intermediate annular member is squeezed into or snap-fittingly pushed into the annular space between the outer ends of the flanges 28 and 34 and over those outer ends into the position shown in FIG. 3.

It will be appreciated that the layer of elastomeric material 82 has and provides an axially facing outer surface 100 (spaced axially from the outer axially facing surface 86 of the flange 36) which is adapted to engage an axially facing surface in the slot 16 of the shaft 10.

Also, the layer of elastomeric material 82 has a uneven radially inwardly facing surface 102. In cross-section, this uneven surface 102 is undulated so as to form gently sloping spaced apart annular ribs and annular grooves in the surface 102, as shown in FIGS. 2 and 3 whereby a good seal can be established between this uneven surface 102 and a radially outwardly facing surface 104 (FIG. 1) at the bottom of the slot 16 in the shaft 10.

As a result, a unitized shaft seal assembly 18 is provided which is unitary rather than having separable parts and which provides a shaft seal assembly 18 including four seals, two within the assembly and two against the shaft on which it is mounted.

From the foregoing description, it will be apparent that a number of advantages are provided by the unitized shaft seal assembly 18 of the present invention, some of which have been described above and others of which are inherent in the invention. Also, it will be apparent that modifications can be made to the shaft seal assembly of the present invention without departing from the teachings of the present invention.

Accordingly, the scope of the invention is only to be limited as necessitated by the accompanying claims.

I claim:

1. A unitized shaft seal assembly comprising an outer rigid annular member including an inner annular ring portion and an outer annular ring portion axially spaced from each other and generally parallel to each other, a first, short, radially inwardly extending flange extending from one edge of said outer annular ring portion, a second, longer radially inwardly extending flange extending from one edge of said inner annular ring portion, and an intermediate flange extending between and integral with the other edges, respectively, of said inner and outer annular ring portions with said outer annular ring portion extending axially outwardly in one direction from said intermediate flange and said inner annular ring portion extending axially outwardly in the opposite direction from said intermediate flange, an inner rigid annular member including an annular, third ring portion generally parallel to said ring portions of said outer annular member, a third, short radially outwardly extending flange extending from one edge of said third ring portion and a fourth, longer radially outwardly extending flange extending from the other edge of said third ring portion, a flexible annular sealing member disposed between said rigid annular members, a coiled spring extending completely around a portion of said flexible annular sealing member for urging a radially inwardly facing surface or edge of said sealing member against a radially outwardly facing surface of said inner annular member, a generally L in cross-section, intermediate rigid annular member being positioned on one axially facing side of said assembly and including a radially extending annular body having a radially inwardly disposed inner portion which is positioned adjacent to and axially inwardly of said third, short flange of said inner annular member so as to be situated between said spring and said third, short flange so that said third, short flange overlaps said inner portion of said radially extending annular body of said intermediate member and said inner portion having an inner annular edge spaced radially outwardly from said radially outwardly facing surface of said inner annular member, said radially extending annular body being spaced axially inwardly of said first, short flange of said outer annular member and having a radially outwardly extending outer portion positioned parallel to said intermediate flange, said intermediate annular member also including an outer ring portion which is integral with an outer annular edge of said outer portion of said radially extending annular body, which extends axially outwardly from said annular body and which is positioned adjacent to and generally parallel to said outer annular ring portion of said outer annular member and having an outer edge on one axially facing side of said intermediate member which is disposed adjacent to an inner axially facing surface of said first, short flange of said outer annular member, and said radially inwardly extending inner portion being disposed axially inwardly of said third, short flange of said inner annular member, an annular elastomeric layer of material on a radially inwardly facing surface of said inner annular member and extending axially from a circle generally opposite said third short flange on and along said inwardly facing surface of said inner annular member to the other axially disposed side of said inner annular member, radially outwardly along said fourth, longer flange around an outer end of said fourth flange and radially inwardly along an axially inwardly facing surface of said fourth flange toward the radially outwardly facing surface of said inner annular member, said second longer flange of said outer annular member having an inner annular edge spaced radially outwardly from said radially outwardly facing surface of said inner annular member and being positioned adjacent and axially inwardly of said fourth, longer flange of said inner annular member, said first, short flange being thinner than said second, longer flange and said third, short flange being thinner than said fourth, longer flange, and said layer of elastomeric material having an annular bead integral therewith and located on the axially inwardly facing surface of said fourth, longer flange, radially inwardly of the outer end of said fourth, longer flange, and, extending outwardly of said layer of elastomeric material and axially of the assembly to engage and form a seal with an outer axially facing surface of said second, longer flange of said outer annular member, and the outer radially inwardly facing surface of said layer of elastomeric material providing at least one sealing surface with a shaft on which the seal assembly is mounted.

2. The assembly of claim 1 including an annular felt ring or washer disposed between said axially inwardly facing surface of said second longer flange and said axially outwardly extending portion of said sealing member.

3. The assembly of claim 1 wherein said radially inwardly extending inner portion of said radially extending annular body of said intermediates member is axially inwardly offset from the plane of the outer portion of said body and has an axially inwardly facing surface which is adapted to engage and retain said coiled spring within said assembly.

4. The assembly of claim 1 wherein the portion of said layer of elastomeric material situated on said radially inwardly facing surface of said inner annular member has on its inner radially facing surface thereof an uneven sealing surface which in an axial cross-section is undulated.

5. The assembly of claim 1 wherein said layer of elastomeric material ends adjacent said bead and has a groove therein between said bead and said outer end of said fourth flange thereby to provide space on each side of said bead for accomodating distortion of said bead when it is compressed between said second and fourth flanges.

6. The assembly of claim 1 further including a spring retaining ring which is disposed between said spring and said outer annular member and which has one edge engaging said radially extending annular body of said intermediate annular member for biasing said intermediate annular member axially outwardly and a short radially inwardly extending flange extending inwardly from the other edge of said spring retaining ring.

7. The assembly of claim 6 wherein said flexible sealing member is L-shaped in cross-section and has a generally axially extending portion and a generally radially outwardly extending portion.

8. The assembly of claim 7 wherein said radially outwardly extending portion of said flexible sealing member is disposed between said flange of said spring retaining ring and an axially inwardly facing surface of said second longer flange of said outer annular member.

* * * * *